April 23, 1968 G. B. FOSTER ET AL 3,379,972
NON-CONTACTING DISPLACEMENT GAUGE HAVING A FEEDBACK MEANS FOR
CONTROLLING THE VIBRATION AMPLITUDE OF THE PROBE
Filed Dec. 26, 1963 4 Sheets-Sheet 1

FIG. I

INVENTORS.
GEORGE B. FOSTER
KENNETH A. OSTRANDER
HALL CARY

LeBlanc and Shur
ATTORNEYS.

INVENTORS.
GEORGE B. FOSTER
KENNETH A. OSTRANDER
HALL CARY

*LeBlanc and Shur*
ATTORNEYS.

INVENTORS
GEORGE B. FOSTER
KENNETH A. OSTRANDER
HALL CARY

LeBlanc and Shur
ATTORNEYS

April 23, 1968 G. B. FOSTER ET AL 3,379,972
NON-CONTACTING DISPLACEMENT GAUGE HAVING A FEEDBACK MEANS FOR
CONTROLLING THE VIBRATION AMPLITUDE OF THE PROBE
Filed Dec. 26, 1963 4 Sheets-Sheet 4

INVENTORS.
GEORGE B. FOSTER
KENNETH A. OSTRANDER
HALL CARY

*LeBlanc and Shur*

ATTORNEYS.

United States Patent Office 3,379,972
Patented Apr. 23, 1968

3,379,972
NON-CONTACTING DISPLACEMENT GAUGE HAVING A FEEDBACK MEANS FOR CONTROLLING THE VIBRATION AMPLITUDE OF THE PROBE
George B. Foster, Worthington, and Kenneth A. Ostrander and Hall Cary, Columbus, Ohio, assignors, by mesne assignments, to Reliance Electric and Engineering Company, Cleveland, Ohio, a corporation of Ohio
Filed Dec. 26, 1963, Ser. No. 333,335
14 Claims. (Cl. 324—61)

ABSTRACT OF THE DISCLOSURE

A non-contact transducer system is described having a non-contact probe element which responds to the distance from an object under inspection, a driver to impart a controlled calibrating vibration to the probe, signal processing circuitry including a feedback circuit for adjusting the calibrating vibration so that the probe output is maintained constant, and measurement circuitry for measuring the value of the feedback signal whereby there is obtained an output analog linearly related to the distance between the probe and object under inspection. The driver disclosed is a piezoelectric crystal device having a number of layers of piezoelectric material separated by conductive layers. Electrical oscillation is coupled to the driver by electrode layers overlying the crystal layers.

---

This invention relates to a non-contacting displacement gauge and more particularly to a capacitive gauge for measuring runout or displacement of a surface without physical contact. While described in conjunction with a capacitive sensor or probe, the present invention may also be used in conjunction with reluctance, eddy current, ionization field, permeability and electrostatic sensors.

Non-contacting probes for measuring variations in the surface of a work piece are well known. In capacitive type probe instruments, variations in the distance of a probe from a work piece caused by irregularities in the work-piece surface vary the capacitance of a suitable detector, and this variation in capacitance may be calibrated in terms of the work piece surface. However, in the past, difficulties have been occasioned by the fact that in most instances the measuring instrument is affected not only by variations in the work piece surface but also by the average distance of the probe from the work piece. This results from the fact that capacitance varies inversely with this distance. Probes of this type have, therefore, necessarily involved either fixedly positioning the probe with respect to the work piece and thus limiting substantially the versatility of the instrument or, in the alternative, required the provision of more or less complex compensating devices to compensate for different measurements taken at different distances from the workpiece.

The present invention avoids the above mentioned difficulties by providing a relatively simplified non-contacting type gauge having an improved compensating arrangement substantially increasing the sensitivity and resolution of the gauge, thus making it possible to measure very minute irregularities in a work piece surface. Important features of the present invention include the provision of a crystal drive for the sensing plate or probe to impart a calibration signal to the instrument, an AC detector circuit substantially reducing the drift sensitivity of the instrument, and a novel feed-back loop making possible a direct reading instrument. The improved crystal drive and probe construction of the present invention makes possible the provision of a more accurately controlled calibration signal.

It is therefore one object of the present invention to provide a novel non-contacting displacement gauge.

Another object of the present invention is to provide a displacement gauge incorporating a novel feed-back loop making possible the direct reading of distance.

Another object of the present invention is to provide a non-contacting displacement gauge having a high frequency detector circuit substantially eliminating drift problems in the gauge.

Another object of the present invention is to provide a novel plate drive for the gauge for imparting a calibration signal to the system.

Another object of the present invention is to provide a novel crystal transducer.

Another object of the present invention is to provide a novel non-contacting probe incorporating an axial type crystal drive.

These and further objects and advantages of the invention will be more apparent upon reference to the following specification, claims and appended drawings wherein:

The system of the present invention provides an arrangement for measuring runout or displacement of a surface without physical contact. While described in conjunction with a capacitance sensor, the present invention may also be used in conjunction with reluctance, eddy current, ionization field, permeability, electrostatic and other type sensors.

In the present invention, the sensitive plate of a capacitive probe is vibrated at a constant frequency. The amplitude of vibration is linearly dependent upon the voltage applied. The function of the vibrating plate is to introduce a dynamic signal ($\Delta S$) which is related to the static signal or standoff distance ($S$). The primary interest in the present invention is in measuring the static signal ($S$), but the usual problem is that the frequency stability of the sensing oscillator is directly related to the system accuracy. For calibration purposes, the device of the present invention introduces a dynamic signal that is related to the distance to the object ($S$) so that the system accuracy is no longer dependent directly upon frequency drift because the output of the detector is AC coupled. The drift rate of the AC system is much better than that of a static or DC system, largely because automatic frequency control is employed to maintain a constant AC sensitivity.

The dynamic characteristic ($\Delta S$) is related to the standoff distance ($S$) in an inverse manner. This relationship is used in conjunction with a negative feedback system incorporated to maintain a constant ratio of dynamic to static signals resulting in a linear readout of the static signal by monitoring the amplitude of the dynamic signal. The feedback is arranged such that an increase in distance ($S$) results in an increase in the amplitude of the dynamic drive to the probe.

The linear readout is in some respects similar to the action of an amplifier with negative feedback. For large forward loop gains, the output is related inversely with the feedback factor (B). In the present system, the dynamic signal (ΔS) is derived in the feedback loop, therefore is related inversely with the output. Since, in the present invention, the ratio (ΔS/S) is held constant, the static displacement (S) is inversely related to the dynamic signal (ΔS). It then follows that the static displacement (S) is directly related to the output.

In order to provide optimum stability of the dynamic characteristic (ΔS), a crystal reference sensing oscillator is incorporated. The RF system stability is therefore dependent upon a minimum of variables.

Figure 1:
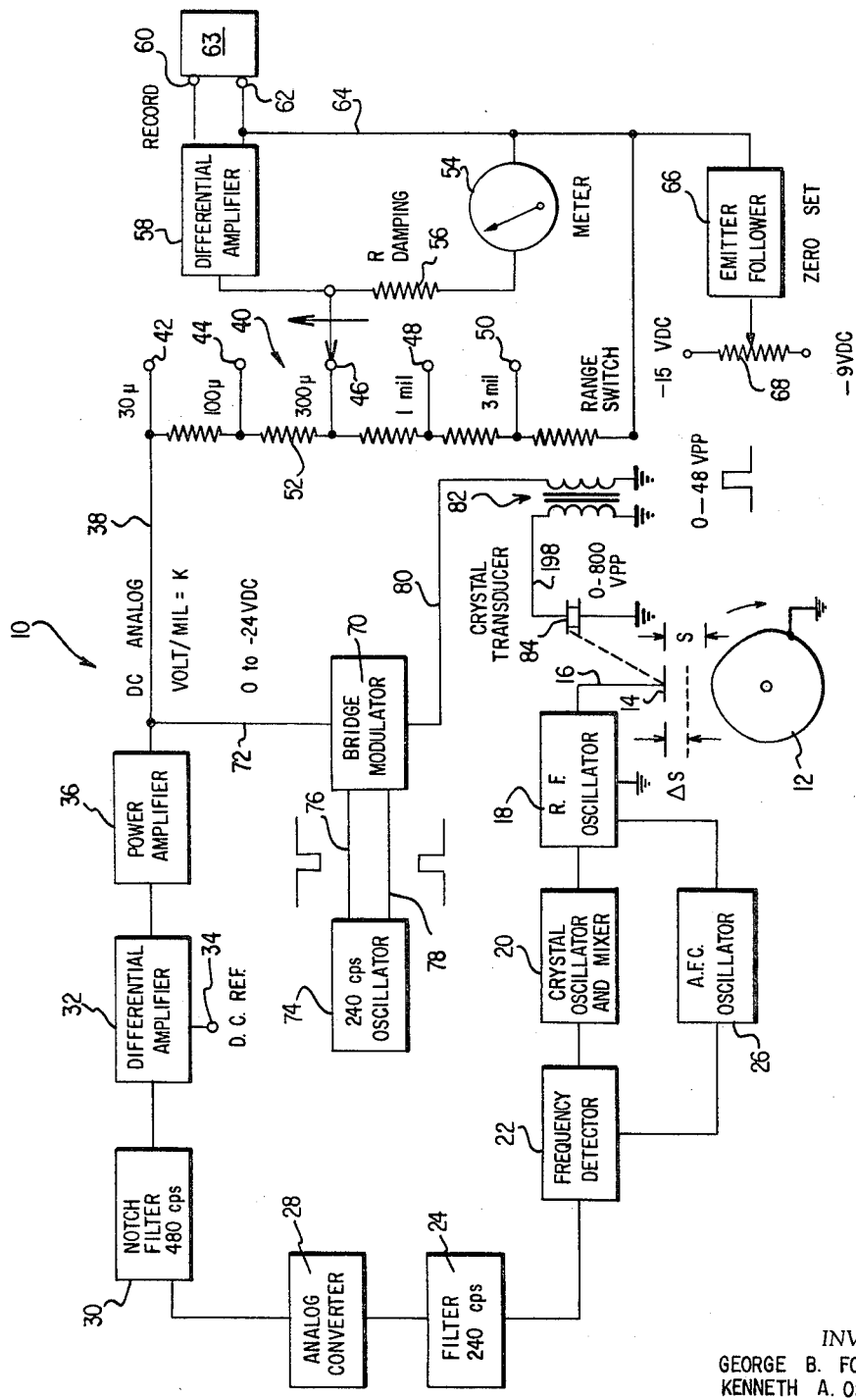
FIGURE 1 is a block diagram of the overall non-contacting displacement gauge of the present invention.

Referring to FIGURE 1, there is shown the overall gauge of the present invention generally indicated at 10 illustrated in conjunction with the detection of the runout or out-of-roundness of a rotary work piece 12 which might be a shaft, cam, or the like. Positioned adjacent the workpiece 12 but spaced therefrom so as to have no contact with the workpiece is the sensing plate 14 of a capacitive probe. Plate 14 is connected by way of lead 16 to a radio frequency sensing oscillator 18 preferably in the form of a series tuned Colpitts or Clapp oscillator more fully shown in FIGURE 3.

The RF carrier output from oscillator 18 is fed to a Pierce crystal oscillator and mixer 20 to produce a fixed IF carrier signal having superimposed thereon frequency modulation representing the variations in the capacitance of probe plate 14. The output from crystal oscillator and mixer 20 is in turn fed to a frequency detector or discriminator 22 which detects the modulation and supplies the detected signal to a filter 24. Frequency detector 22 also supplies an automatic frequency control amplifier 26 which feeds back signal from the frequency detector 22 to the RF sensing oscillator 18 so as to maintain a constant intermediate frequency output from crystal oscillator and mixer 20 in a well known manner.

The output from filter 24 is supplied to an analog converter 28 which produces a DC output corresponding to the AC input supplied to it. The analog converter 28 is coupled to a notch filter 30 which acts to eliminate any AC ripple in the DC output of the analog converter 28. The signal from notch filter 30 is fed to a differential amplifier or comparator 32 which compares the DC or analog signal with a DC reference signal applied to differential amplifier input terminal 34.

As a result of the comparison, amplifier 32 produces a DC analog output or difference signal to a DC power amplifier 36. The output from the power amplifier is supplied by way of lead 38 to a range switch 40 connectable to a plurality of terminals 42, 44, 46, 48 and 50 in turn coupled to a potentiometer 52. Manual adjustment of switch 40 serves to vary the resistance in potentiometer 52 connected across meter 54 and in this way acts to vary the range of the meter.

Switch 40 is connected to the meter through a damping resistor 56 and is also coupled through a differential amplifier 58 to a pair of recording terminals 60 and 62 to which may be connected a suitable recording instrument 63. Recording terminal 62 is connected by way of lead 64 to the other side of meter 54, to the lower end of the potentiometer 52 and to a zero set emitter follower 66. Emitter follower 66 is connected to a potentiometer 68 whose opposite ends are at minus 15 volts DC and minus 9 volts DC.

The output from power amplifier 36 is also supplied to a bridge modulator 70 by way of lead 72. The DC analog voltage supplied to the bridge modulator 70 is modulated by a 240 cycle-per-second oscillator 74 having a pair of equal but oppositely phased pulse output leads 76 and 78. The resulting 240 cycle AC output on lead 80 from the bridge modulator is proportional in amplitude to the analog input on lead 72 and supplies the primary winding of a voltage step-up transformer 82. The secondary of the transformer is coupled to and drives a crystal transducer 84 which is physically connected to and which oscillates the plate, 14. In FIGURE 1, the vibrations of the plate 14 resulting from the crystal 84 are indicated by the distance (ΔS) while the average or standoff distance is indicated as (S).

In operation of the system of FIGURE 1, the probe is mounted near the work piece and adjusted until the average reading DC meter 54 indicates near zero at the highest range. For final touch-up, the electrical zero set control provided by potentiometer 68 may be operated.

The probe vibrates at a fixed frequency of 240 cycles per second at some amplitude (ΔS) depending upon the DC level out of the power amplifier 36. The pick-up converts the motion (ΔS) into a frequency deviation (ΔF) of the carrier frequency RF oscillator 18 so that the carrier frequency is frequency modulated. A carrier frequency of 8 megacycles is preferred; however, other frequencies may be used.

The RF oscillator output from 18 providing the frequency modulation is mixed with the output of a crystal controlled Pierce oscillator in element 20 to give a difference or IF frequency of 461 kc. The intermediate frequency is frequency modulated with a maximum of 8 kc. band width. Frequency detector 22 demodulates this IF signal.

The output of the frequency detector is coupled back through the AFC amplifier circuit 26 to the sensing oscillator 18 to maintain a 461 kc. center frequency. The output of the detector 22 to filter 24 provides an AC signal voltage that is directly related in amplitude to the amplitude of the probe vibration (ΔS) and inversely related to the standoff distance (S). In order to maximize the signal to noise ratio, the 240 cycle-per-second selective filter 24 is provided between the frequency detector and the AC to DC signal to analog converter 28. The converter is a full wave average detector and in order to reduce the ripple content of the analog, the 480 cycle-per-second notch filter 30 is utilized.

The analog signal is coupled to the DC comparator or differential amplifier 32. As the input analog decreases slightly negative with respect to the DC reference terminal 34, the output of the differential amplifier 32 tends to swing positive a large amount but is restricted by the negative feedback action when the system loop is closed. Power amplifier 36 is provided to give adequate current gain to drive the transducer meter and recorder.

With the system loop completed, the action of the system is controlled to maintain a constant DC analog level into the input of the differential amplifier 32. The power amplifier 36, bridge modulator 70, transformer 82 and drive crystal 84 are in the nature of a feedback acting to maintain this input to differential amplifier 32 constant. The tap-off from the output of power amplifier 36 to the meter 54 by way of lead 38 is therefore a tap-off from the feedback portion of the loop.

With the system loop completed, as the standoff distance decreases, the RF system provides more output signal. The DC analog to the differential amplifier 32 increases negatively causing the output DC analog to decrease. The action is extended further to decrease the amplitude of the vibration (ΔS) until the closed loop is stable. The operational system provides a linear output analog directly related to the standoff distance (S). With a minus 24 volt DC power supply to the various elements of the system, the output has a range of from minus 4 to minus 20 volts DC for optimum linearity.

If meter 54 is operated as a center zero meter, the reference or meter return is centered about minus 12 volts DC. The zero center control provided by potentiometer 68 is included for ease of centering the meter and recorder. The zero set voltage reference is applied to emitter follower 66 to provide a low impedance reference to the meter and recorder scaling circuits. A common attenuator is used for both recorder and meter outputs. For optimum meter response, the source impedance to the meter circuit is held nearly constant by keeping the attenuator impedance low and the series damping resistor 56 near the value required for critical damping. The recorder and meter circuits are isolated to prevent their respective back EMF's from interacting.

Figure 2:
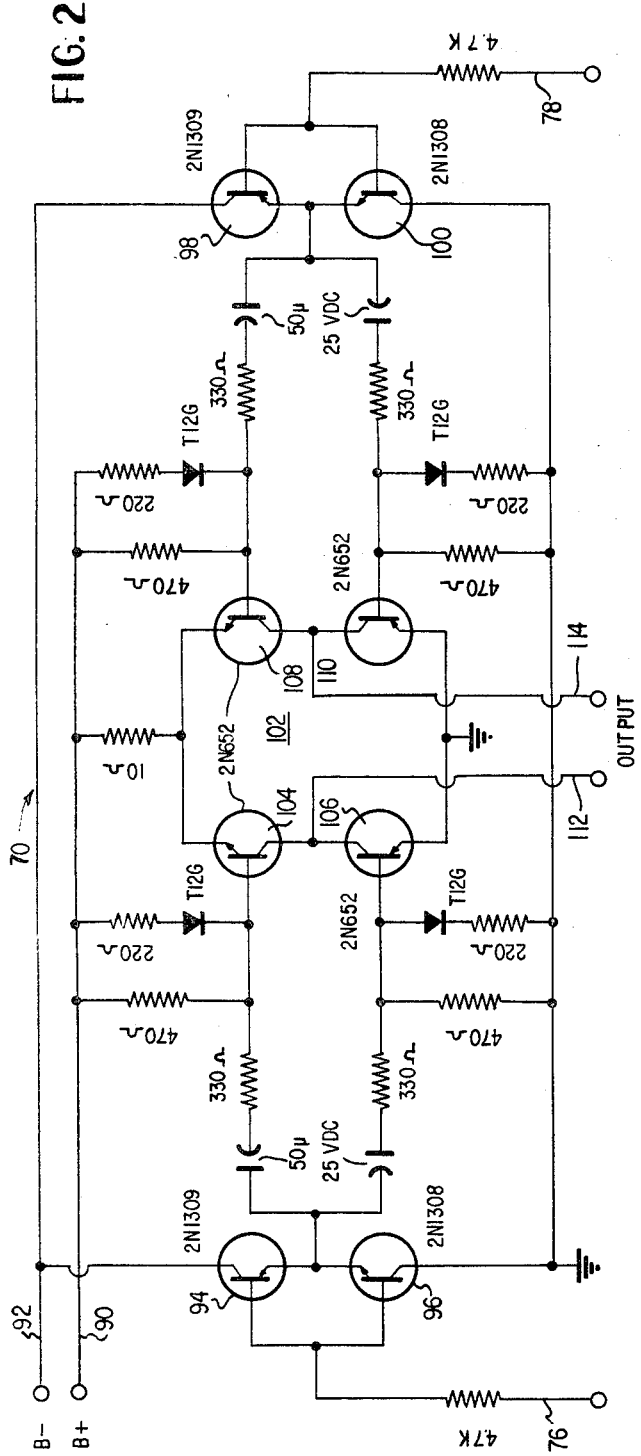
FIGURE 2 is a detailed circuit diagram of the bridge modulator portion of the circuit of FIGURE 1.

FIGURE 2 is a detailed circuit diagram of the bridge modulator 70 of FIGURE 1. Bridge modulator 70 is provided with plus and minus power supply terminals 90 and 92 respectively and with input leads 76 and 78 from the oscillator 74. The unit is provided with a first pair of complementary emitter follower input transistors 94 and 96 for input lead 76 and similar complementary transistors 98 and 100 for input lead 78.

The function of the bridge modulator 70 is that of modulating a DC level to produce a square wave with amplitude directly related to the DC level. The circuit has the advantage of operating very efficiently with very good amplitude stability. The circuit is driven by two square waves with a 180 degree phase difference between them.

The circuit is primarily a bridge 102 consisting of four switching transistors 104, 106, 108 and 110. One set of opposing legs of the bridge is gated on while the other set is gated off. The load current therefore is reversed each half cycle with the full DC applied voltage across the load each time. The resulting output at output leads 112 and 114 is an AC voltage having a peak to peak amplitude of twice the applied DC level.

Figure 3:
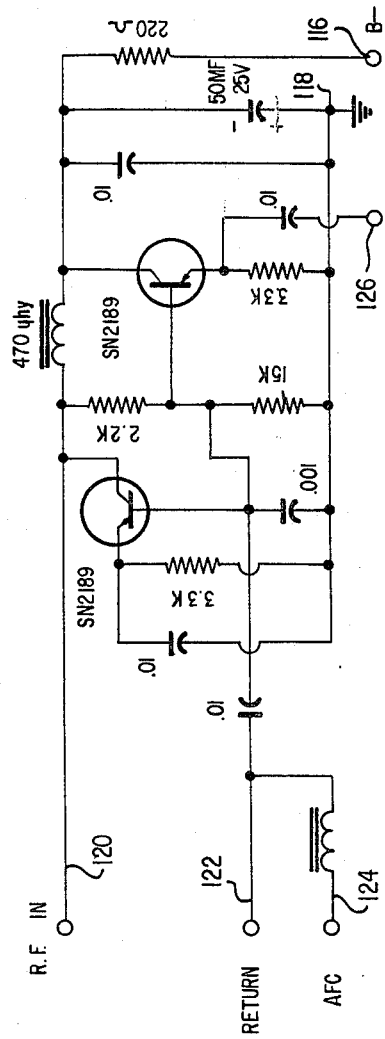
FIGURE 3 is a circuit diagram of the radio frequency sensing oscillator of the circuit of FIGURE 1.

FIGURE 3 is a circuit diagram of the sensing RF oscillator 18 of FIGURE 1. This oscillator is provided with a negative supply terminal 116 and a ground terminal 118. Terminals 120 and 122 are the radio frequency input and return terminals, respectively, coupled to the RF portion of the probe circuit of FIGURE 4. Also provided is an AFC return terminal 124 and the output to the crystal oscillator and mixer is taken by way of output terminal 126. The sensing oscillator is essentially a series tuned Colpitts oscillator (sometimes called a Clapp oscillator).

Figure 4:
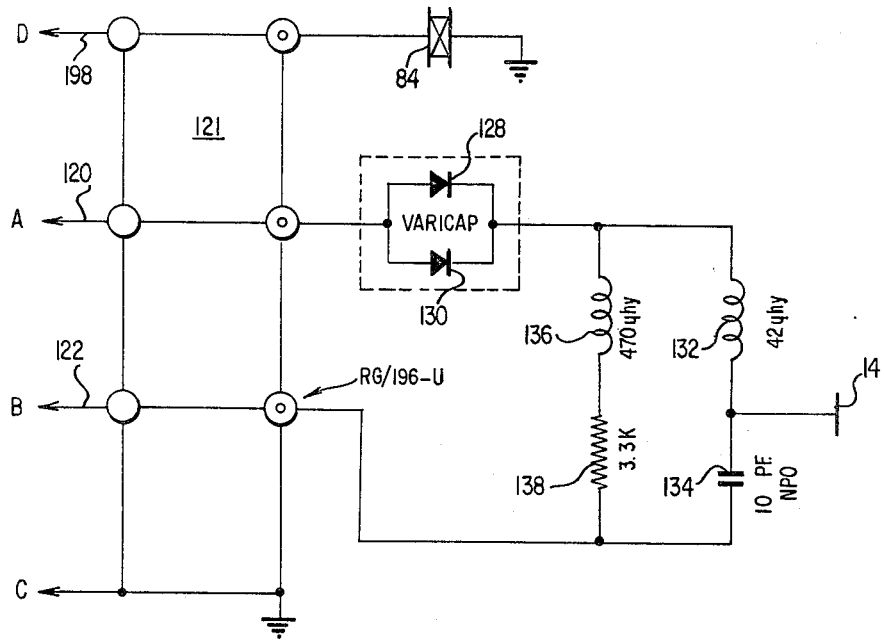
FIGURE 4 is a circuit diagram for the probe of FIGURES 5–7.

FIGURE 4 shows the probe circuit including the remainder of the sensing oscillator circuit. The portion of the sensing oscillator circuit illustrated in FIGURE 4 is incorporated in the sensing head of FIGURES 5–7. The transistor portion of the circuit illustrated in FIGURE 3 is typically a grounded emitter stage for optimum RF gain and minimum noise. The DC operation of this portion of the circuit is as a common collector stage to provide optimum bias stability.

Oscillator RF leads 120 and 122 are coupled through an amphenol connector generally indicated at 121 in FIGURE 4 to a pair of standoff insulators 127 and 129. These are in turn connected to the tuned portion of the oscillator circuit which comprises a pair of varactors or varicaps 128 and 130, an inductor 132, a fixed capacitor 134 and the capacitor plate 14. The output impedance of the series resonant circuit is low, therefore, the cable and stray capacitances do not appreciably affect the resonant frequency.

Varicaps 128 and 130 are coupled through an inductor 136 and a resistor 138. The inductor 136 reduces the RF loading on the tuned circuit while the resistor 138 limits the (Q) of the inductor to prevent low frequency oscillations.

Drive crystal 84 is similarly coupled through a standoff insulator 197 and connector 121 to lead 198 from transformer 82 in FIGURE 1.

Figure 5:
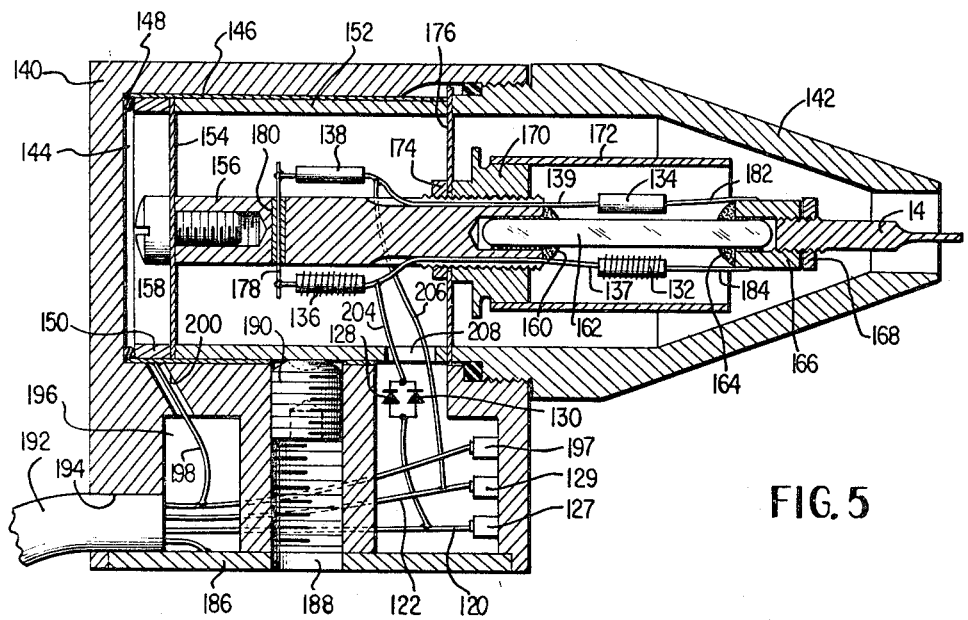
FIGURES 5–7 are cross section and end views, respectively, of the novel non-contacting probe of the present invention illustrating the axial crystal drive.
Figure 6:
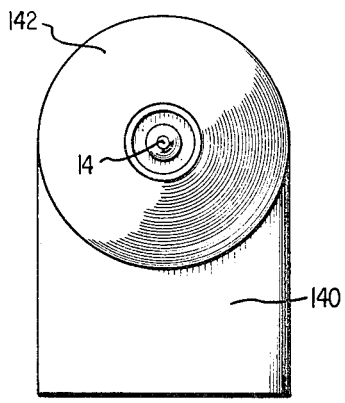
Figure 7:
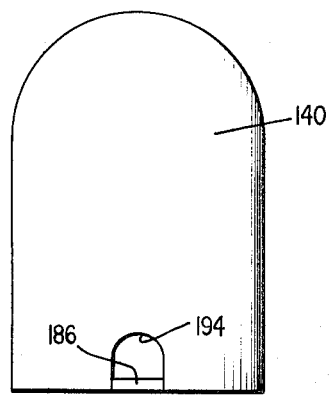

FIGURE 5 is a cross-sectional view through the probe housing of capacitor plate 14 and FIGURES 6 and 7 are front and rear end views of the probe housing respectively. All of the electrical elements illustrated in FIGURE 4 are within the probe housing which consists of two main elements, namely, a casing 140, and a nose cone 142, threaded into or otherwise suitably secured to the casing 140. Casing 140 is provided with an interior cavity 144 painted as at 146 with a suitable insulating material and receiving a resilient O-ring 148 and a narrow terminal ring 150. Painted coating 146 assures that the terminal ring 150 will be electrically insulated by this coating and by the resilient O-ring 148 from the metal casing 140. A second larger terminal ring 152 is received within the cavity 144 and held between the two terminal rings 150 and 152 is an annular crystal 154, described in more detail below. Crystal 154 is secured to the end of a metal shaft 156 by a fillet-head nylon screw 158 passing through the center of the crystal and threadedly received in the end of the shaft 156.

Secured by epoxy resin 160 to the other end of the metal shaft 156 is a glass rod 162. The outer end of this rod is attached by further epoxy resin 164 to a hollow metal probe adaptor 166, carrying the capacitor plate or probe 14. Probe 14 is secured to metal adaptor 166 by a lock-nut 168.

Threaded over shaft 156 is a stop nut 170, supporting a tubular metal shield 172. Between the stop nut 170 and a further lock nut 174 is an annular beryllium copper spring 176 having its outer periphery rigidly received in and tightly engaged by casing 140. Coil 136 is connected to resistor 138 by a short lead 178 passing through a suitable aperture in the shaft 156 and secured in the aperture and insulated therefrom by a suitable material such as dental resin as indicated at 180. Shaft 156 is further provided with elongated narrow grooves for the passage of leads connecting resistor 138 and coil 136 to the capacitor 134 and coil 132 by leads 137 and 139, respectively. These latter two circuit elements are connected by leads 182 and 184 to metal adaptor 166, in turn, in electrical contact with the probe 14.

Covering the bottom of the casing 140 is a face plate 186, and the face plate and casing are preferably slotted as at 188 to receive a set screw 190, for positioning the terminal ring, 152, in the casing. Electrical connections to the elements are by way of a cable 192 passing through a rear aperture 194 in the casing and into an annular chamber 196. One lead 198 from the cable is connected through a channel 200 in the casing directly to the narrow terminal ring 150 to establish electrical connection to that terminal. Wider terminal ring 152 is in electrical contact with the interior casing which is in turn grounded. The three standoff insulators 127, 129 and 197 of FIGURE 5 are provided in the annular chamber 196 and these support the leads and varicaps 128 and 130. Flexible leads 204 and 206 pass upwardly through a slot 208 in ring 152 to make electrical connection with the leads 137 and 139. Shield 172 is connected to the grounded casing by way of stopnut 170 and spring 176.

Figure 8:
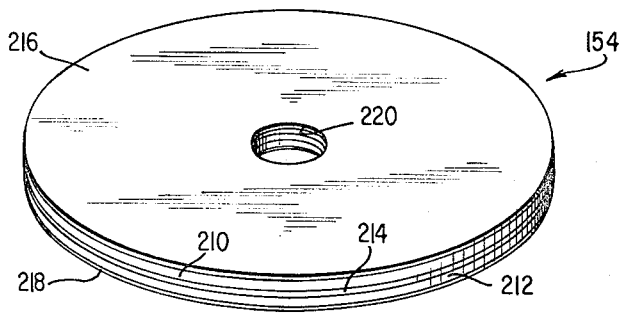
FIGURE 8 is a perspective view of the drive crystal incorporated in the probe of FIGURES 5–7.
Figure 9:
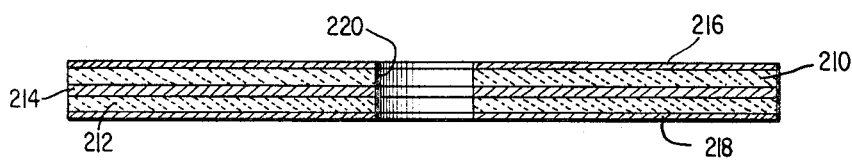
FIGURE 9 is a cross section through the crystal of FIGURE 8.

FIGURES 8 and 9 show the details of the drive crystal 154. The crystal comprises a pair of layers of piezoelectric ceramic material, indicated at 210 and 212 separated by a layer of brass 214. Conductive electrodes 216 and 218 cover the outer surfaces of the ceramic layers. The ceramic material may be of the type referred to as PZT 5, made by the Clevite Electronic Components Division of Clevite Corporation of Bedford, Ohio. The crystal is of disc shape but is provided with a central aperture 220 providing a passage for the screw 158 of FIGURE 5.

The crystal 154 in the probe housing of FIGURE 5 acts in the nature of an annular bender Bimorph with its outer peripheral edges firmly retained between the terminal rings 150 and 152. The energization of the ring 150 with respect to the grounded ring 152, causes the central portion of the crystal to flex or oscillate so as to impart an axial oscillating motion by way of nylon screw 158 to the end of the metal support shaft 156. This oscillation acts against the annular spring 176 and is in turn transmitted through glass rod 162, causing the capacitor probe 14 to oscillate or reciprocate along its longitudinal axis.

It is apparent from the above that the present invention provides a novel crystal drive arrangement and a novel feedback type non-contacting gauge for measuring runout or variations in the surface of a workpiece. The gauge of this invention possesses substantially increased resolution with a minimum of drift and when provided with a 0.010 inch diameter probe may be used to monitor displacements as small as one-millionth of an inch. The gauge operates over a frequency range of from 0 to 30 cycles per second, and is more than adequate for measuring waviness and roundness. The output linearity is better than 2% and the dynamic range of linearity is limited primarily by the available power supply.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A non-contacting displacement gauge comprising a sensing probe adapted to be positioned adjacent a workpiece, means for imparting a controlled mechanical calibrating signal to said probe, means for deriving an output signal from said probe inversely related to the distance of said probe from said workpiece and directly related to said calibration signal, feedback means for feeding a signal dependent on said output signal to adjust said calibrating signal to maintain said output signal constant, and means for measuring said feedback signal.

2. A non-contacting displacement gauge comprising a sensing probe adapted to be positioned adjacent a workpiece, calibrating means for imparting a controlled mechanical oscillation to said probe, means for deriving an AC output signal from said probe directly related to the amplitude of said calibrating oscillation and inversely related to the distance of said probe from said workpiece, feeding means for feeding a signal dependent on said output signal to adjust the amplitude of said calibrating oscillation to maintain said output signal constant, and means for measuring said feedback signal.

3. A non-contacting displacement gauge as set out in claim 1 wherein said means for imparting a calibrating signal to said probe includes crystal drive means comprising a pair of layers of piezoelectric material, a layer of conductive material separating said layers of piezoelectric material, a plurality of electrodes overlying said layers of piezoelectric material, an electrical oscillator coupled to said electrodes to cause mechanical oscillation of said drive means, and means coupling said drive means to said probe to impart said mechanical oscillation thereto.

4. A non-contacting displacement gauge as set out in claim 3 further including means responsive to said feedback signal to adjust the amplitude of the electrical oscillation coupled to said electrodes.

5. A non-contacting displacement gauge comprising a capactive probe adapted to be positioned adjacent a workpiece, drive means for imparting a calibrating oscillation to vary the distance from said probe to said workpiece, a radio frequency oscillator including said probe in its frequency determining circuit, detecting means coupled to the output of said oscillator for developing an analog signal directly related to said calibrating oscillation and inversely related to the standoff distance of said probe from said workpiece, means for feeding a signal dependent on said output signal to said drive means to adjust the amplitude of said calibrating oscillation to maintain said analog signal constant, and means for measuring said feedback signal.

6. A gauge according to claim 5 wherein said radio frequency oscillator is coupled to said detecting means through an intermediate frequency oscillator and mixer, and means for feeding a signal from said detecting means to said radio frequency oscillator to maintain the center frequency of the output from said mixer constant.

7. A gauge according to claim 6 wherein said intermediate frequency oscillator is crystal controlled.

8. A non-contacting displacement gauge as set out in claim 5 further including error detector means coupled to said detector for sensing variations in said analog signal, said means for feeding a signal back to said drive means being responsive to the output of said error detector to adjust the amplitude of said calibrating oscillation.

9. A non-contacting displacement gauge as set out in claim 5 where said drive means comprises a piezoelectric crystal having first and second annular layers of piezoelectric material, an annular layer of conductive material separating said layers of piezoelectric material, annular electrodes overlying each of said layers of piezoelectric material, electrical oscillator means coupled to said electrodes to establish said calibrating oscillation, and means coupling said drive means to said capacitive probe.

10. A non-contacting displacement gauge comprising a capacitive probe adapted to be positioned adjacent a workpiece, a piezoelectric crystal mechanically coupled to said probe, electrical means for imparting a drive signal to said crystal for oscillating said probe, a radio frequency oscillator including said probe in its frequency determining circuit whereby the output of said oscillator is frequency modulated by changes in the relative distance between said probe and workpiece, an intermediate frequency oscillator and mixer coupled to the output of said radio frequency oscillator, an FM detector coupled to the output of said mixer, an automatic frequency control amplifier coupling said FM detector to said radio frequency oscillator to maintain a constant center frequency out of said mixer, a comparator coupled to said FM detector for comparing the output of said FM detector with reference signal and generating a corresponding difference signal, means for feeding said difference signal back to said crystal drive means to maintain the output of said FM detector constant, and means for measuring the magnitude of said difference signal.

11. A gauge according to claim 10 wherein said comparator is provided with a DC reference signal, and converter means between said FM detector and said comparator for converting the output of said FM detector into an analog signal.

12. A gauge according to claim 11 wherein said measuring means comprises a differential amplifier, meter and recorder.

13. A non-contacting displacement gauge comprising a capacitive probe adapted to be positioned adjacent a workpiece, a piezoelectric crystal mechanically coupled to said probe, electrical means for imparting a drive signal to said crystal for oscillating said probe, a radio frequency oscillator including said probe in its frequency determining circuit whereby the output of said oscillator is frequency modulated by changes in the relative distance between said probe and workpiece, an intermediate frequency oscillator, a mixer coupled to the output of said radio frequency oscillator, and said intermediate frequency oscillator an FM detector coupled to the output of said mixer, an automatic frequency control amplifier coupling said FM detector to said radio frequency oscillator to maintain a constant center frequency out of said mixer, an analog converter coupled to the output of said FM detector, a comparator coupled to the analog output of said converter, means for applying a DC reference signal to said comparator whereby said comparator produces a difference signal representative of the difference between said analog output and said reference signal, a modulator coupled between the output of said comparator and said crystal drive means for feeding back an AC signal to said crystal drive means representative of said difference signal, said feedback signal acting to maintain said analog output constant, a range switch coupled to the output of said comparator, a meter and differential amplifier coupled to said range switch, and emitter follower means coupled to said meter, for establishing the zero set thereof.

14. A gauge according to claim 13 wherein said probe is coupled to one end of a drive shaft, a housing for said probe, spring means mounting said drive shaft in said housing, and an annular bimorph bender crystal having its periphery tightly held and its radial inner edge connected to the other end of said drive shaft, and contact means on each side of said crystal whereby energization of said contact means causes said crystal to oscillate said shaft along its longitudinal axis.

References Cited

UNITED STATES PATENTS

| | | | |
|---|---|---|---|
| 3,180,136 | 4/1965 | Foster | 324—61 X |
| 3,187,256 | 6/1965 | Foster et al. | 324—61 |
| 3,252,084 | 5/1966 | Krobath | 324—40 |
| 2,796,756 | 6/1957 | Yates et al. | 73—1 |
| 3,263,167 | 7/1966 | Foster et al. | 324—61 |
| 3,316,486 | 4/1967 | Woods | 340—282 XR |

RUDOLPH V. ROLINEC, *Primary Examiner.*

WALTER L. CARLSON, *Examiner.*

E. E. KUBASIEWICZ, *Assistant Examiner.*